United States Patent
Cho et al.

(10) Patent No.: US 10,933,734 B2
(45) Date of Patent: Mar. 2, 2021

(54) POWER TRANSMISSION APPARATUS OF HYBRID ELECTRIC VEHICLE

(71) Applicants: Hyundai Motor Company, Seoul (KR); Kia Motors Corporation, Seoul (KR)

(72) Inventors: Hyun Jae Cho, Seoul (KR); Tae Sic Park, Busan (KR); Ok Ju Cho, Seoul (KR); Seongeun Park, Anyang-si (KR); KwangMin Choi, Seoul (KR); Jun Hoi Huh, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 85 days.

(21) Appl. No.: 16/413,454

(22) Filed: May 15, 2019

(65) Prior Publication Data
US 2020/0171934 A1  Jun. 4, 2020

(30) Foreign Application Priority Data
Nov. 30, 2018 (KR) .......... 10-2018-0152647

(51) Int. Cl.
*B60K 6/44* (2007.10)
*F16H 37/04* (2006.01)
*B60K 6/365* (2007.10)

(52) U.S. Cl.
CPC ............ *B60K 6/44* (2013.01); *B60K 6/365* (2013.01); *F16H 37/04* (2013.01); *B60Y 2200/92* (2013.01)

(58) Field of Classification Search
CPC .......... B60K 6/44; B60K 6/365; F16H 37/04; B60Y 2200/92

USPC .......................................................... 475/5
See application file for complete search history.

(56) References Cited

U.S. PATENT DOCUMENTS

| 7,695,387 B2 | 4/2010 | Oba | |
| 8,684,880 B2 * | 4/2014 | Kato | F16H 63/3416 |
| | | | 192/219.5 |
| 8,771,139 B2 * | 7/2014 | Ideshio | B60K 6/40 |
| | | | 477/8 |
| 9,216,641 B2 * | 12/2015 | Ono | B60K 6/387 |

(Continued)

FOREIGN PATENT DOCUMENTS

| JP | 3991875 B2 | 10/2007 |
| KR | 10-1500355 B1 | 3/2015 |

*Primary Examiner* — Leslie A Nicholson, III
(74) *Attorney, Agent, or Firm* — Morgan, Lewis & Bockius LLP

(57) ABSTRACT

A power transmission apparatus of a hybrid electric vehicle, may include an engine and first and second motor/generator, the power transmission apparatus includes a planetary gear set including first, second, and third rotation elements, a first shaft fixedly connected to the first rotation element and a rotor of the first motor/generator, a second shaft fixedly connected to the second rotation element and the engine, a third shaft fixedly connected to the third rotation element, a fourth shaft externally meshed with the second shaft and the third shaft, a fifth shaft fixedly connected to a rotor of the second motor/generator, a sixth shaft externally meshed with the fourth shaft and the fifth shaft and transmitting rotational power of the engine and the first and second motor/generators to a final reduction gear of a differential gear and three gear trains externally engaged with the first to sixth shafts.

8 Claims, 4 Drawing Sheets

(56) References Cited

U.S. PATENT DOCUMENTS

| | | | | |
|---|---|---|---|---|
| 9,604,530 B2* | 3/2017 | Omuro | ............... | F16H 61/0265 |
| 9,809,107 B2* | 11/2017 | Shibata | ................. | B60K 6/383 |
| 9,840,142 B2* | 12/2017 | Okuwaki | ................. | B60K 6/48 |
| 9,845,088 B2* | 12/2017 | Hoess | ............... | B60W 30/1882 |
| 9,849,772 B2* | 12/2017 | Takami | ................... | F16H 3/727 |
| 9,902,393 B2* | 2/2018 | Endo | .................... | B60W 10/08 |
| 9,944,279 B2* | 4/2018 | Hata | .................... | B60W 10/08 |

* cited by examiner

POWER TRANSMISSION APPARATUS OF HYBRID ELECTRIC VEHICLE

CROSS-REFERENCE TO RELATED APPLICATION

The present application claims priority to Korean Patent Application No. 10-2018-0152647 filed on Nov. 30, 2018, the entire contents of which is incorporated herein for all purposes by this reference.

BACKGROUND OF THE INVENTION

Field of the Invention

The present invention relates to a power transmission apparatus of for a hybrid electric vehicle. More particularly, the present invention relates to a power transmission apparatus of for a hybrid electric vehicle which may improve system efficiency while maintaining a mode switching operability by applying a synchronizer.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

Therefore, vehicle makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the existing fossil fuel and a motor/generator driven by electrical energy are mixed and used as the power sources.

In the hybrid electric vehicle, an EV mode in which the hybrid electric vehicle is driven by only the motor, an HEV mode using both the engine and the motor, and an ENG mode using only the engine may be implemented according to the combination of the engine and the motor. Furthermore, the hybrid electric vehicle can acquire a significant fuel efficiency enhancement effect as compared with the conventional vehicle through idle stop of stopping the engine when the vehicle stops, fuel saving by regenerative braking that drives a generator by use of kinetic energy of the vehicle instead of braking by the existing friction when the vehicle is braked, and stores in a battery electrical energy generated at the time of driving the generator and reuses the stored electrical energy in driving the vehicle, and the like.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus of for a hybrid electric vehicle having advantages of improving system efficiency while maintaining a mode switching operability by applying a synchronizer A power transmission apparatus of a hybrid electric vehicle, including an engine and first and second motor/generator as power sources, the power transmission apparatus according to an exemplary embodiment of the present invention may include a planetary gear set including first, second, and third rotation elements, a first shaft fixedly connected to the first rotation element and a rotor of the first motor/generator, a second shaft fixedly connected to the second rotation element and the engine, a third shaft fixedly connected to the third rotation element, a fourth shaft externally meshed with the second shaft and the third shaft, a fifth shaft fixedly connected to a rotor of the second motor/generator, a sixth shaft externally meshed with the fourth shaft and the fifth shaft and transmitting rotational power of the engine and the first and second motor/generators to a final reduction gear of a differential gear and three gear trains externally engaged with the second to sixth shafts so that the rotational power is transmitted.

The power transmission apparatus may further include a synchronizer disposed on the second shaft, and selectively connecting synchronously the second shaft to a transmission housing or to an gear coaxially and externally disposed with the second shaft without rotational interference therebetween.

The planetary gear set may be a single pinion planetary gear set including a sun gear, a planet carrier and a ring gear as the first, second, and third rotation elements respectively.

The three gear trains may include a first gear train including a first gear fixedly disposed on the third shaft and a second gear fixedly disposed on the fourth shaft and externally meshed with the first gear, a second gear train including a third gear coaxially and externally disposed with the second shaft without rotational interference and selectively connectable synchronously with the second shaft though a synchronizer, a fourth gear fixedly disposed on the fourth shaft and externally meshed with the third gear and a fifth gear fixedly disposed on the sixth shaft and externally meshed with the fourth gear and the final reduction gear and a third gear train including a sixth gear fixedly disposed on the fifth shaft and a seventh gear fixedly disposed on the sixth shaft and externally meshed with the sixth gear.

A power transmission apparatus of a hybrid electric vehicle, including an engine and first and second motor/generator as power sources, the power transmission apparatus according to an exemplary embodiment of the present invention may include a planetary gear set including a sun gear as a first rotation element, a planet carrier as a second rotation element and a ring gear as a third rotation element, a first shaft fixedly connected to the first rotation element and a rotor of the first motor/generator, a second shaft fixedly connected to the second rotation element and the engine, a third shaft fixedly connected to the third rotation element, a fourth shaft externally meshed with the second shaft and the third shaft, a fifth shaft fixedly connected to a rotor of the second motor/generator, a sixth shaft externally meshed with the fourth shaft and the fifth shaft and transmitting rotational power of the engine and the first and second motor/generators to a final reduction gear of a differential gear and three gear trains externally engaged with the second to sixth shafts so that the rotational power is transmitted, and wherein a synchronizer is disposed on the second shaft, and selectively connecting synchronously the second shaft to a transmission housing or to an gear coaxially and externally disposed with the second shaft without rotational interference therebetween.

The three gear trains may include a first gear train including a first gear fixedly disposed on the third shaft and a second gear fixedly disposed on the fourth shaft and externally meshed with the first gear, a second gear train including a third gear as the gear coaxially and externally disposed with the second shaft without rotational interference and selectively connectable synchronously with the second shaft though a synchronizer, a fourth gear fixedly disposed on the fourth shaft and externally meshed with the third gear and a fifth gear fixedly disposed on the sixth shaft and externally meshed with the fourth gear and the final reduction gear and a third gear train including a sixth gear fixedly disposed on the fifth shaft and a seventh gear fixedly disposed on the sixth shaft and externally meshed with the sixth gear.

The power transmission apparatus configured for a hybrid vehicle according to an exemplary embodiment of the present invention may be switched to a power split mode, an electric vehicle mode, and a fixed gear mode according to the control of the synchronizer, improving the system efficiency while maintaining the mode switching operability.

Furthermore, the power transmission apparatus configured for a hybrid vehicle according to the exemplary embodiment of the present invention does not use the conventional friction elements (for example, clutches, brakes and the like) and one-way clutches, simplifying the configuration and contributing to weight reduction, and fuel efficiency may be improved.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
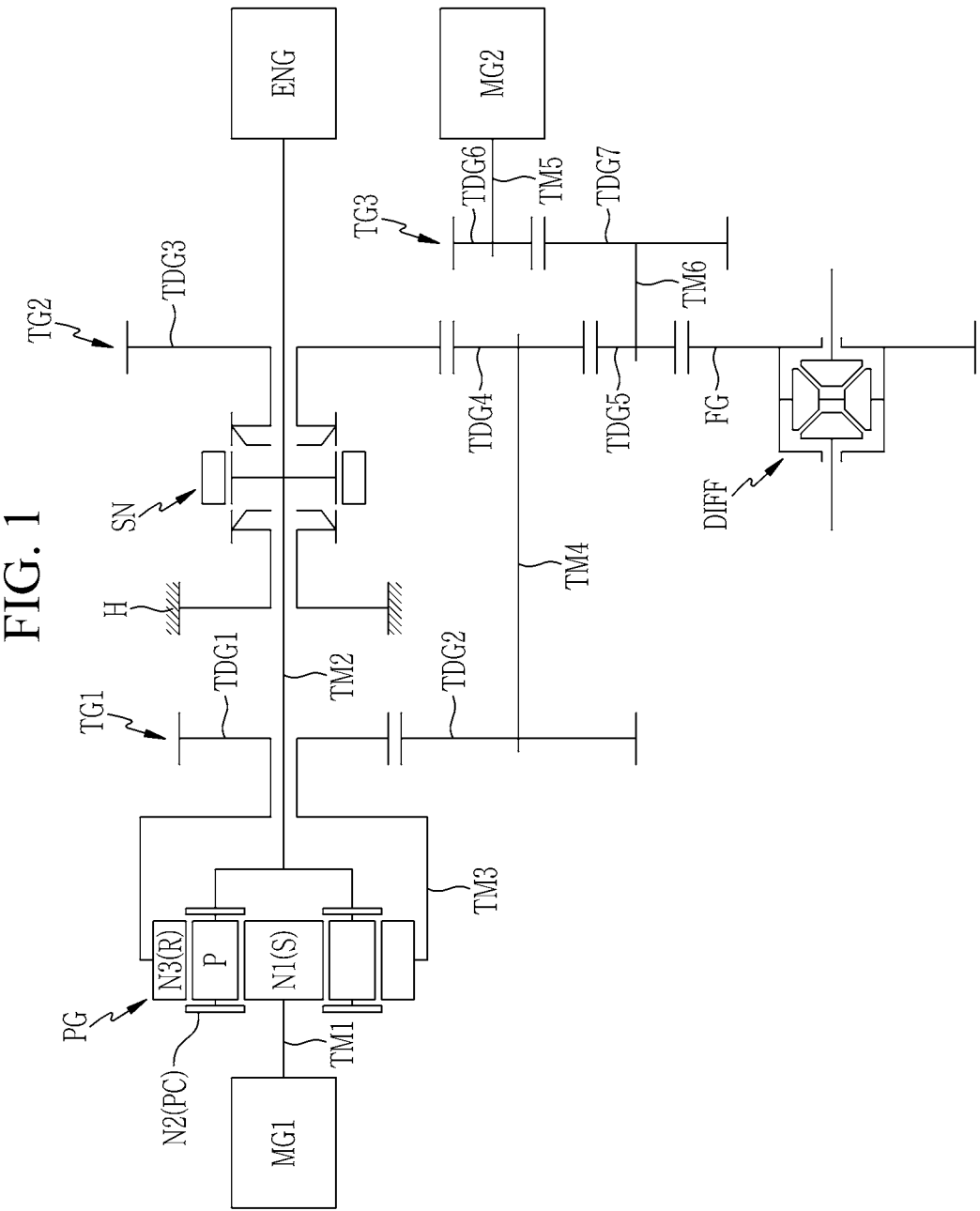
FIG. 1 is a schematic diagram of a power transmission apparatus of a hybrid electric vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a power transmission apparatus of a hybrid electric vehicle according to an exemplary embodiment of the present invention.

Referring to FIG. 1, A power transmission apparatus of a hybrid electric vehicle according to an exemplary embodiment of the present invention may include an engine ENG and first and second motor/generators MG1 and MG2 as power sources, six shafts TM1-TM6, and a planetary gear set PG distributing rotational powers of the engine ENG and the first motor/generator MG1. The power transmission apparatus may further include one synchronizer SN and rotational powers from the engine ENG, the planetary gear set PG and the second motor/generator MG2 are transmitted to a final reduction gear FG of a differential gear DIFF.

As the main power source, the engine ENG may be a known various engine such as a gasoline engine or a diesel engine using conventional fossil fuels.

The first and second motor/generators MG1 and MG2 serve as an auxiliary power source and function as a motor and a generator as known in the art and each have a stator fixed to a transmission housing H, and a rotor rotatably supported inside the stator in the radial direction thereof.

The planetary gear set PG is a single pinion planetary gear set and includes a sun gear S as a first rotation element N1, a planet carrier PC as a second rotation element N2 rotatably supporting a plurality of pinion gears P externally gear-meshed with the sun gear S, and a ring gear R as a third rotation element N3 internally gear-meshed with the plurality of pinion gears P.

The engine ENG, the first/second motor/generators MG1 and MG2 and the planetary gear set PG are connected to each other via the six shafts TM1 to TM6 to transmit power.

That is, the configuration of the six shafts TM1 to TM6 will be described in detail.

The first shaft TM1 is fixedly connected to the sun gear S which is the first rotation element N1 of the planetary gear set PG and the first motor/generator MG1.

At the instant time, the first shaft TM1 may be an axis integrally connected to a motor shaft connected to a rotor of the first motor/generator MG1.

The second shaft TM2 is fixedly connected to the output side of the engine ENG and the planet carrier PC which is the second rotation element N2 of the planetary gear set PG.

At the instant time, the second shaft TM2 may be an input shaft that transmits the rotational power of the engine ENG.

The synchronizer SN is disposed on the second shaft TM2. The synchronizer SN synchronously connects the second shaft TM2 to the transmission housing H or connects the second shaft TM2 to fourth shaft TM4.

Connecting the second shaft TM2 with the transmission housing H means that the rotation of the second shaft TM2 is stopped to thereby suppress the driving of the engine ENG.

The third shaft TM3 is fixedly connected to the ring gear R which is the third rotation element N3 of the planetary gear set PG.

The fourth shaft TM4 is formed of an intermediate shaft disposed parallel to the second shaft TM2 and is externally meshed with the third shaft TM3 so that it is configured for transmitting power to each other.

The fifth shaft TM5 is fixedly connected to the second motor/generator MG2.

At the instant time, the fifth shaft TM5 may mean an axis integrally connected to a motor shaft connected to a rotor of the second motor/generator MG2.

The sixth shaft TM6 is an intermediate axis disposed parallel to the fifth shaft TM5 and is externally meshed with the fifth shaft TM5 so that it is configured for transmitting power to each other.

The shafts TM1 to TM6 are externally meshed through first, second, and third gear trains TG1, TG2, and TG3 so that the rotational power is transmitted.

The first gear train TG1 includes a first gear TDG1 fixedly disposed on the third shaft TM3 and a second gear TDG2 fixedly disposed on the fourth shaft TM4, and externally meshed with the first gear TDG1.

The second gear train TG2 includes a third gear TDG3 coaxially and externally disposed with the second shaft TM2 without rotational interference and selectively connectable synchronously with the second shaft TM2 though the synchronizer SN, a fourth gear TDG4 fixedly disposed on the fourth shaft TM4 externally meshed with the third gear TDG3 and a fifth gear TDG5 fixedly disposed on the sixth shaft TM6 and externally meshed with the fourth gear TDG4 and the final reduction gear FG.

The third gear train TG3 includes a sixth gear TDG6 fixedly disposed on the fifth shaft TM5 and a seventh gear TDG7 fixedly disposed on the sixth shaft TM6 and externally meshed with the sixth gear TDG6.

The respective gear ratios of the first to seventh gears TDG1 to TDG7 and the final reduction gear FG are set according to the design conditions of the transmission.

Figure 2:
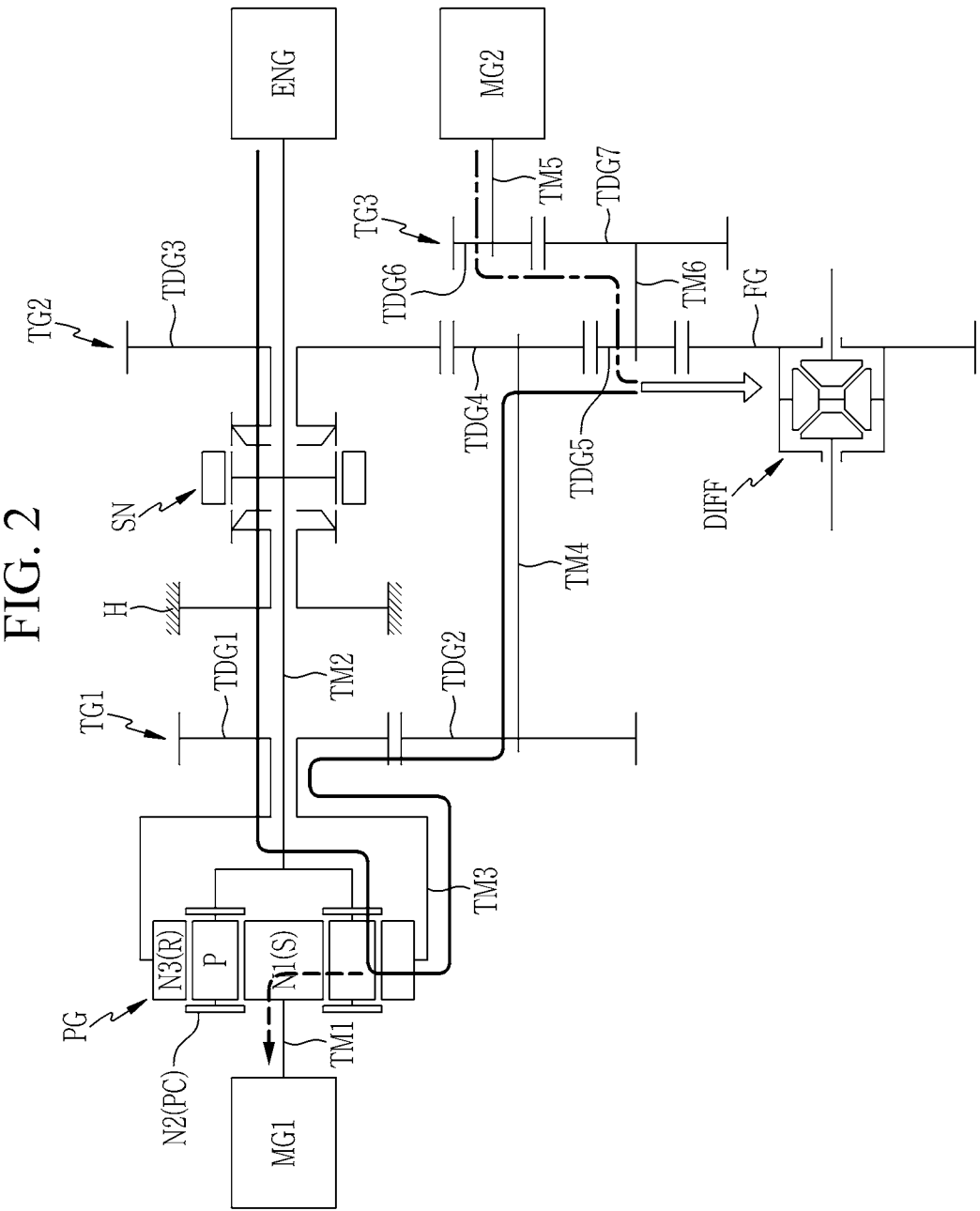
FIG. 2 a power transmission path diagram in a power split mode of a power transmission apparatus for a hybrid vehicle according to an exemplary embodiment of the present invention.

FIG. 2 a power transmission path diagram in a power split mode of a power transmission apparatus for a hybrid vehicle according to an exemplary embodiment of the present invention.

In the power split mode, the vehicle is driven by the rotational power of the engine ENG and the rotational power of the second motor/generator MG2.

The rotational power of the engine ENG is transmitted to the planet carrier PC as the second rotation element N2 of the planetary gear set PG via the second shaft TM2 as indicated by the solid line arrow, and a portion thereof is transferred to the first motor/generator MG as indicated by the dotted arrow, and charging process may proceed.

A portion of the rotational power is transmitted to the fourth shaft TM4 via the third shaft TM3, the first gear TDG1 and the second gear TDG2, and the rotational power transmitted to the fourth shaft TM4 is transmitted to the final reduction gear FG of the differential gear DIFF via the fourth gear TDG4 and the fifth gear TDG5 and finally transmitted to drive wheels.

The rotational power of the second motor/generator MG2 is output through the fifth shafts TM5 as shown by the arrow of the one-dotted chain line and is transmitted to the sixth shaft TM6 through the sixth gear TDG6 and the seventh gear TDG7. and the rotational power transmitted to the sixth shaft TM6 is combined with the rotational power of the engine ENG in the fifth gear TDG5 to be transmitted to the final reduction gear FG of the differential DIFF, and is transmitted to the drive wheels.

Figure 3:
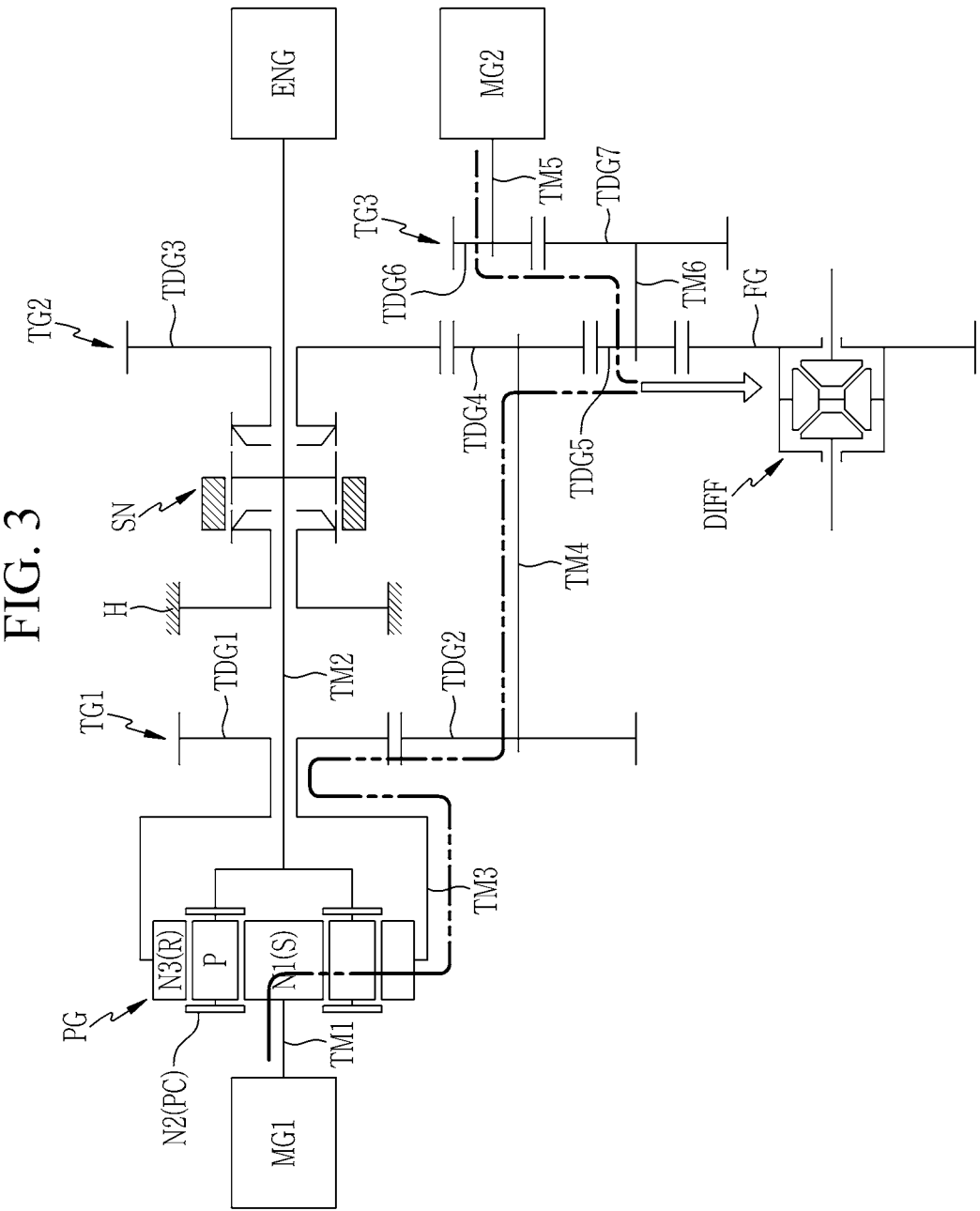
FIG. 3 is a power transmission path diagram in an electric vehicle mode of a power transmission apparatus for a hybrid vehicle according to an exemplary embodiment of the present invention.

FIG. 3 is a power transmission path diagram in an electric vehicle mode (EV mode or two motor mode) of a power transmission apparatus for a hybrid vehicle according to an exemplary embodiment of the present invention.

In the electric vehicle mode, the engine ENG is stopped and the vehicle is driven by the rotational power of the first and second motor/generators MG1 and MG2.

The second shaft TM2 is fixed to the transmission housing H via the synchronizer SN and the rotational power of the first motor generator MG1 is transmitted to the first rotation element N1 of the planetary gear set PG through the first shaft TM1.

As such, in the planetary gear set PG, the second rotation element N2 is operated as a fixed element by fixing of the second shaft TM2, and the output is made through the third rotation element N3. The rotational power output through the third rotation element N3 is transmitted to the fourth shaft TM4 through the third shaft TM3, the first gear TDG1 and the second gear TDG2, and the rotational power transmitted to the fourth shaft TM4 is transmitted to the final reduction gear FG of the differential DIFF via the fourth and fifth gears TDG4 and TDG5 and finally transmitted to the drive wheels.

The rotational power of the second motor/generator MG2 is output through the fifth shaft TM5 as shown by the arrow of the one-dotted chain line and is transmitted to the sixth shaft TM6 through the sixth gear TDG6 and the seventh gear TDG7. and the rotational power transmitted to the sixth shaft TM6 is combined with the rotational power of the first motor/generator MG1 in the fifth gear TDG5 to be transmitted to the final reduction gear FG of the differential DIFF, and is transmitted to the drive wheels.

Figure 4:
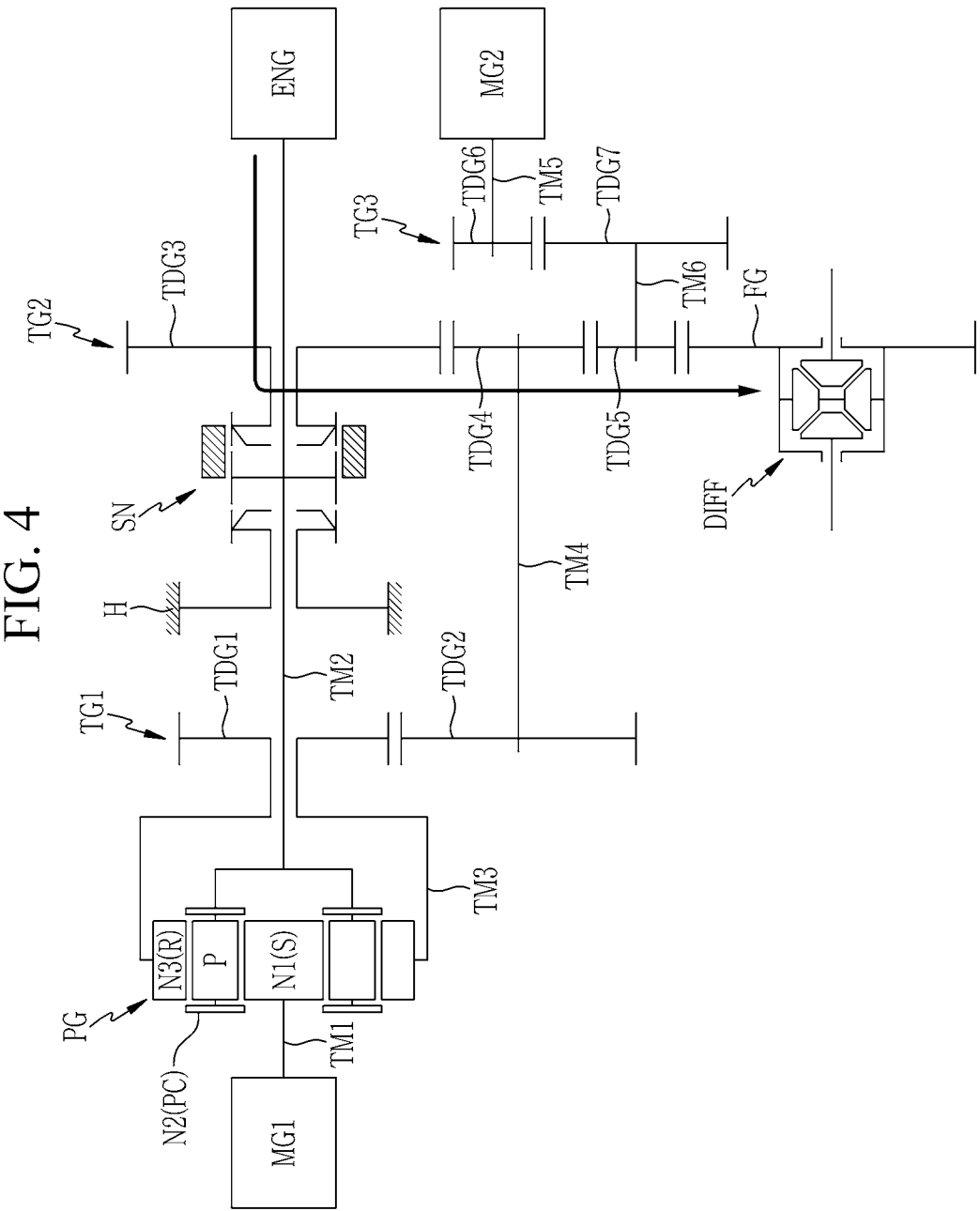
FIG. 4 is a power transmission path diagram in a fixed gear mode of a power transmission apparatus for a hybrid vehicle according to an exemplary embodiment of the present invention.

FIG. 4 is a power transmission path diagram in a fixed gear mode of a power transmission apparatus configured for a hybrid vehicle according to an exemplary embodiment of the present invention.

In the present fixed gear mode, only the rotational power of the engine ENG is applied. A. At the instant time, the second shaft TM2 and the third gear TDG3 are synchronously connected through the synchronizer SN.

The rotational power of the engine ENG is output through the second shaft TM2 as indicated by the solid line arrow and transmitted to the final reduction gear FG of the differential DIFF though the third gear TDG3, the fourth gear TDG4 and the fifth gear TDG5, and is transmitted to the drive wheels.

As described above, the hybrid vehicle power transmission apparatus according to the exemplary embodiment of the present invention may be switched to the power split mode, the electric vehicle mode, and the fixed gear mode according to the control of the synchronizer SN, and thus system efficiency may be improved.

Furthermore, the power transmission apparatus for a hybrid vehicle according to the exemplary embodiment of the present invention does not use the conventional friction elements (clutches, brakes) and one-way clutches, simplifying the configuration and contributing to weight reduction, and thus fuel efficiency may be improved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission apparatus of a hybrid electric vehicle, including an engine and first and second motor/generator as power sources, the power transmission apparatus comprising:
    a planetary gear set including a first rotation element, a second rotation element, and a third rotation element;
    a first shaft fixedly connected to the first rotation element and the first motor/generator;
    a second shaft fixedly connected to the second rotation element and the engine;
    a third shaft fixedly connected to the third rotation element;
    a fourth shaft engaged with the second shaft and the third shaft;
    a fifth shaft fixedly connected to the second motor/generator;
    a sixth shaft engaged with the fourth shaft and the fifth shaft and transmitting rotational power of the engine and the first and second motor/generators to a final reduction gear of a differential gear;
    three gear trains engaged with the second to sixth shafts so that the rotational power is transmitted to the final reduction gear; and
    a synchronizer mounted on the second shaft and configured for selectively connecting the second shaft to a transmission housing or to a gear rotatably mounted on the second shaft.

2. The power transmission apparatus of claim 1, wherein the planetary gear set is a single pinion planetary gear set including a sun gear, a planet carrier and a ring gear as the first rotation element, the second rotation element and the third rotation element respectively.

3. The power transmission apparatus of claim 1, wherein the three gear trains include:
    a first gear train including:
        a first gear fixedly mounted on the third shaft; and
        a second gear fixedly mounted on the fourth shaft and engaged with the first gear;
    a second gear train including:
        a third gear rotatably mounted on the second shaft and selectively connectable with the second shaft by the synchronizer;
        a fourth gear fixedly mounted on the fourth shaft and engaged with the third gear; and
        a fifth gear fixedly mounted on the sixth shaft and engaged with the fourth gear and the final reduction gear; and
    a third gear train including:
        a sixth gear fixedly mounted on the fifth shaft; and
        a seventh gear fixedly mounted on the sixth shaft and engaged with the sixth gear.

4. The power transmission apparatus of claim 3, wherein the first gear is rotatably mounted on the second shaft.

5. The power transmission apparatus of claim 3,
    wherein the gear rotatably mounted on the second shaft is the third gear, and
    wherein the synchronizer is mounted on the second shaft, and configured for selectively connecting the second shaft to the transmission housing or to the third gear rotatably mounted on the second shaft.

6. A power transmission apparatus of a hybrid electric vehicle, including an engine and first and second motor/generator as power sources, the power transmission apparatus comprising:
    a planetary gear set including a sun gear as a first rotation element, a planet carrier as a second rotation element and a ring gear as a third rotation element;
    a first shaft fixedly connected to the first rotation element and the first motor/generator;
    a second shaft fixedly connected to the second rotation element and the engine;
    a third shaft fixedly connected to the third rotation element;
    a fourth shaft engaged with the second shaft and the third shaft;
    a fifth shaft fixedly connected to the second motor/generator;
    a sixth shaft engaged with the fourth shaft and the fifth shaft and transmitting rotational power of the engine and the first and second motor/generators to a final reduction gear of a differential gear; and
    three gear trains engaged with the second to sixth shafts so that the rotational power is transmitted to the final reduction gear, and
    wherein a synchronizer is mounted on the second shaft, and is configured to selectively connect the second shaft to a transmission housing or to a gear rotatably mounted on the second shaft.

7. The power transmission apparatus of claim 6, wherein the three gear trains include:
    a first gear train including:
        a first gear fixedly mounted on the third shaft; and
        a second gear fixedly mounted on the fourth shaft and engaged with the first gear;

a second gear train including:
  a third gear as the gear rotatably mounted on the second shaft and selectively connectable with the second shaft by the synchronizer;
  a fourth gear fixedly mounted on the fourth shaft and engaged with the third gear; and
  a fifth gear fixedly mounted on the sixth shaft and engaged with the fourth gear and the final reduction gear; and
a third gear train including:
  a sixth gear fixedly mounted on the fifth shaft; and
  a seventh gear fixedly mounted on the sixth shaft and engaged with the sixth gear.

8. The power transmission apparatus of claim 7, wherein the first gear is rotatably mounted on the second shaft.

* * * * *